US008657678B2

(12) United States Patent
Mackey et al.

(10) Patent No.: US 8,657,678 B2
(45) Date of Patent: Feb. 25, 2014

(54) INTRA-OFFICE REGULATORY COMPLIANCE TESTING SYSTEM

(75) Inventors: David Mackey, Las Vegas, NV (US); David Arnold, Boulder City, NV (US); Ana Downing-Mason, Las Vegas, NV (US); Peter Nikiper, Las Vegas, NV (US)

(73) Assignee: Gaming Laboratories International, LLC, Lakewood, NJ (US)

(*) Notice: Subject to any disclaimer, the term of this patent is extended or adjusted under 35 U.S.C. 154(b) by 65 days.

(21) Appl. No.: 13/320,934

(22) PCT Filed: May 28, 2010

(86) PCT No.: PCT/US2010/036507

§ 371 (c)(1),
(2), (4) Date: Nov. 17, 2011

(87) PCT Pub. No.: WO2010/141335

PCT Pub. Date: Dec. 9, 2010

(65) Prior Publication Data

US 2012/0064980 A1 Mar. 15, 2012

Related U.S. Application Data

(60) Provisional application No. 61/182,826, filed on Jun. 1, 2009.

(51) Int. Cl.
*A63F 9/24* (2006.01)
*G06F 17/00* (2006.01)

(52) U.S. Cl.
USPC .................... 463/29; 463/40; 463/41; 463/42

(58) Field of Classification Search
USPC ................................................ 463/29, 40–42
See application file for complete search history.

(56) References Cited

U.S. PATENT DOCUMENTS

2003/0233129 A1* 12/2003 Matos ............................... 607/5

(Continued)

FOREIGN PATENT DOCUMENTS

EP 1480102 A2 11/2004
WO WO 2006128019 A2 * 11/2006
WO WO-2007/075278 A2 7/2007

OTHER PUBLICATIONS

Supplementary European Search Report; prepared by European Patent Office; date Oct. 17, 2012.

*Primary Examiner* — Werner Garner

(74) *Attorney, Agent, or Firm* — Fox Rothschild LLP; Richard C. Woodbridge; Ryan N. Miller

(57) ABSTRACT

A regulatory compliance testing system permits a gaming machine (30-44) at a first location (14-20) to be tested for regulatory compliance with casino system software (44*a*,46) located at a second location (12) in a different jurisdiction. A plurality of different casino systems (46) can be kept at the second location (12) and each is associated with one specific port (54*b*-54*e*) at the first location so that each different type or model of gaming machine (14-20) has its own home port (54*a*-54*e*). A secured VPN Layer 2 network (24*a*-24*e*) including multisystem isolation made possible by VLAN (26*a*-26*e*) tunnels connects both locations and permits seamless and secure connectivity as if the gaming machine (30-44) and its associated accounting software (46) were located at the same location. The system (10) permits three (3) basic modes of testing. First, the gaming machine (30-44) may be tested at the first location (14-20) by an engineer at the first location (14-20). Second, the gaming machine (30-44) may be tested by a person at the second location (12). Third, a plurality of gaming machines (30-44) of the same type my be plugged into the same numbered port (54*a*-54*e*) at more than one locations and simultaneously tested from one or more different locations (12-20).

12 Claims, 2 Drawing Sheets

(56) References Cited

U.S. PATENT DOCUMENTS

2009/0029767 A1 1/2009 Buchholz et al.
2009/0069094 A1 * 3/2009 Brosnan et al. ................. 463/42
2009/0109946 A1 * 4/2009 Morton et al. ................ 370/338

* cited by examiner

INTRA-OFFICE REGULATORY COMPLIANCE TESTING SYSTEM

CROSS REFERENCE TO RELATED APPLICATIONS

The present application is a 35 USC §371 National Phase application of International Application Serial No. PCT/US2010/036507 which claims priority from U.S. Provisional Patent Application Ser. No. 61/182,826 filed on Jun. 1, 2009 by David Mackey, David Arnold, Ma-Downing-Mason and Peter Nikiper and entitled "GLILINK".

BACKGROUND OF THE INVENTION

1. Field of the Invention

The invention relates to a system and method for performing regulatory compliance testing on a gaming machine at one, or at many locations, with associated its casino system at another location.

2. Description of Prior Art

Prior Art regulatory compliance testing systems require that the gaming device being testing be at the same physical location as the casino system that operates with it. The term "casino system" can comprise a number of different software driven systems that might typically include an accounting software system, player tracking system, promotional system, ticketing system, lottery system, content server system, server-based system, etc. . . . or any other type of software the gaming machine needs to interact with. This approach, however, has a number of significant disadvantages. In particular, it requires the manufacturer to physically transport the machine to the test location. That can be expensive and may produce damage to the machine. Also, the ability to test the gaming machine at a specific location will be, of necessity, limited by the testing equipment at that physical location. Multiple testing locations also lend themselves to greater security concerns. Lastly, there are a number of inefficiencies built into having multiple independent test sites.

It was in this context that an effort was made to determine the feasibility of remotely testing gaming equipment, such as slot machines and video games, from remote locations wherein the video game is located at a first location and its associated casino system is located at a separate physical location which could be another jurisdiction, another state, or even another country. Remote testing, however, is not an easy task. Gaming machines have to be rigorously tested against various gaming scripts; the system has to be absolutely secure; and, the interaction between the gaming machine and the accounting system has to be seamless and operate as though, in fact, the gaming machine and the accounting system were in the same physical location.

Remote testing of non-gaming equipment, such as scientific devices, is known in other arts but is not employed in the gaming industry because of the high level of complexity involved. The present invention described in detail in this disclosure, was recently recognized as one of the most innovative concepts in the gaming industry. See, in particular, "Celebrating The 20 Most Innovative Gaming Products Of The Last Year" in the May 2010 edition of *Casino Journal*, page 27 and "GLIlink Earns Top Spot on Top 20 List" on page 8 of *Slot Manager Magazine* May/June 2010.

SUMMARY OF THE INVENTION

The invention comprises a method and system that enables the testing of various network-based gaming products from remote office locations. The local host system connects through the internet to other host systems and gaming devices in various test offices throughout the country or throughout the world. The connection is made via secured VPN Layer 2 communications, and multi-system isolation is made possible via VLAN tunnels. The use of a layer 2 connection provides virtually complete transparency between the gaming device and the host system. The system is capable of operating in three (3) modes. In the first mode, a gaming device in a first office can be tested by an engineer at the first office an on using a casino system located at a second office. In a second mode, the gaming machine in the first office can be tested by an engineer in a second office. In a third mode, multiple gaming machines can be connected to the system at multiple locations and tested from a plurality of other remote locations. In this fashion one can simulate the usage of multiple gaming machines on the same system as one might find, for example, in a real casino environment.

These and other features of the inventions will be more fully understood by reference to the following drawings.

DESCRIPTION OF PREFERRED EMBODIMENT

During the course of this description like element numbers will be used to identify like elements according to the different figures that illustrate the invention.

Figure 1:
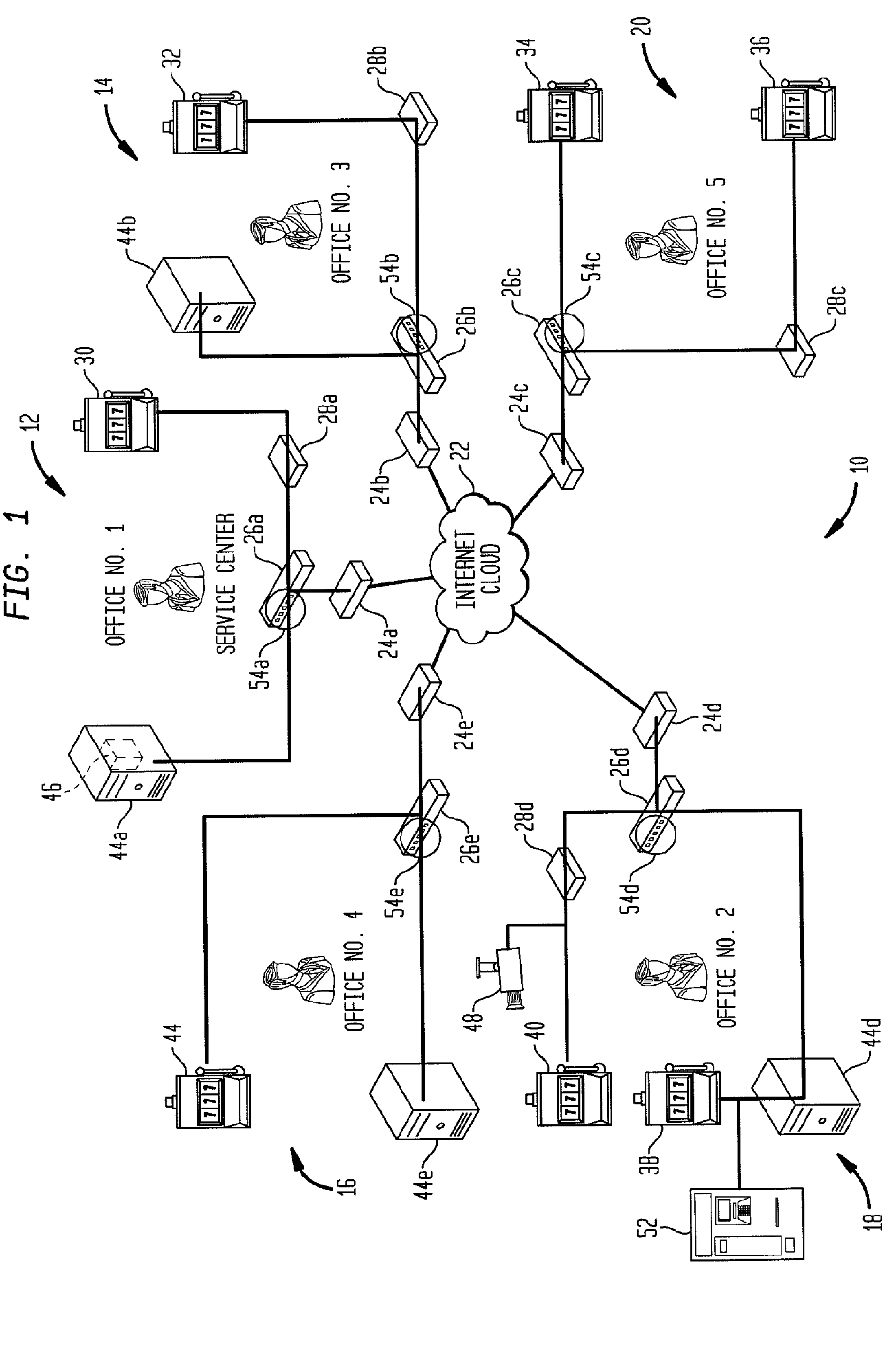
FIG. 1 is a general overview of the invention showing multiple gaming machines connected at multiple offices via the Internet.

The invention (10) enables the testing of various network-based gaming products (30-42) from remote testing office locations (12, 14, 16, 18, 20). The local host systems connect through the Internet (22) to other host systems and gaming devices (30, 32, 34, 36, 38, 40, 42, 44) located in the various testing offices as shown in FIG. 1. Previously host systems, and the gaming devices that connect to them, had to be placed in the same physical location for testing regulatory compliance. The present invention (10) allows gaming devices located in any testing office (12-20) to be connected to the required host that can be located in any other testing office around the world. The connection is made via secured VPN Layer 2 (24*a*-24*e*) communications, and multisystem isolation is made possible via VLAN tunnels. Since the link is through a Layer 2 connection, the implementation is completely transparent to the gaming devices (30-44) and host systems. The following hardware is required:

Ethernet based Internet connection (22) (DSL, Cable Modem, Ethernet T-1, etc.);

VPN (Virtual Private Network) Layer 2 Router (24*a*-24*e*);

Managed switch with VLAN (Virtual Local Area Network) Trunking (26*a*-26*e*);

Manufacturer supplied Online Casino Accounting Host System (46);

Manufacturer supplied hardware to connect a Gaming device to the host system (28*a*-28*e*);

Manufacturer supplied Gaming Device to be tested (30, 32, 34, 36, 38, 40, 42).

Sample Testing Configuration

In the following example shown in FIG. 2, a test engineer in Office No. 2 (18) will be testing a slot machine (40) for regulatory compliance that will also be tested on an online casino system (46) located at testing office No. 1 (12).

In Office No. 2, the slot machine (40) is connected to a manufacturer supplied SMIB (Slot Machine Interface Board) (28*d*) that connects to a manufacturer supplied polling server (44*d*). The Polling server (44*d*) connects to a VLAN port (54*d*) on the switch, and the VLAN trunk port (54*d*) on the switch connects to the VPN server (54*d*, 24*d*). This portion in turn securely connects to the Internet (22).

In Service Office No. 1, the manufacturer supplied online accounting system software (46) resident on server (44*a*) connects to a port (54*a*) on the VLAN switch (26*a*), and the VLAN trunk port (54*a*) on the switch (26*a*) connects to the VPN server (24*a*). This portion then also securely connects to the Internet (22).

The type of internal connections are dependant upon the manufacturer of the online casino system (46), and the manufacturer of the gaming device (40) to be tested. To facilitate the interface between the two offices (12,18), the following hardware is currently preferred:

Engage Communications BlackDoor VPN Servers (24*a* and 24*d*);

Dell PowerConnect 2724 VLAN Managed Switches (26*a* and 26*d*);

Internet Connections (DSL, Cable Modem, Ethernet T-1, etc.) (22)

The VPN connection will pass all Ethernet protocols through including, but not limited to: TCP/IP, UDP, DHCP, DNS G2S (Game to System), S2S (System to System), and proprietary manufacturer protocols.

Figure 2:
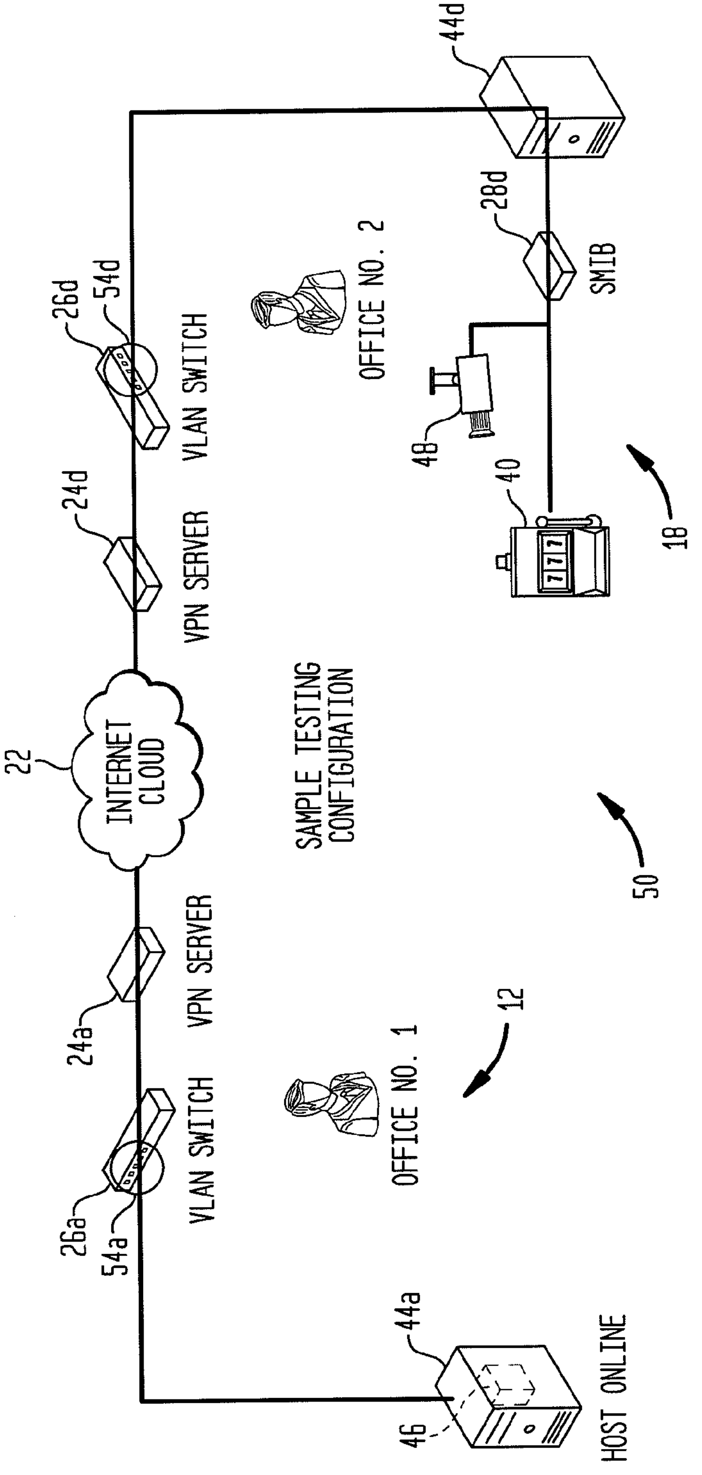
FIG. 2 is a diagram illustrating a typical hook up in which a gaming machine in a first office is connected via the Internet to a host on-line accounting system located at a second office.

The example (50) in FIG. 2 illustrates a first mode of operation, namely, where a machine (40) in Office No. 2 (18) is tested by the engineer in Office No. 2 using the casino software (46) on the server (44*a*) in Office No. 1. Office No. 1 (12) is referred to as the Server Office since it is the office that could have multiple copies of different casino packages (46) for different types of gaming machines (30-44).

According to a second mode of operation, the gaming machine (40) in Office No. 2 is tested with the casino accounting software (46) on the server (44*a*) by the engineer in Office No. 1.

Finally, according to a third embodiment, as best understood from FIG. 1, multiple gaming machine (30-44) can be connected to the system (10) at multiple offices (12-20) and tested simultaneously on the casino software (46) on server (44*a*). This third mode has a number of permutations but is most similar to a real life casino environment where multiple gaming machines (30-44) may be running all at the same time. Trying to bring all of them together under the same roof for testing could otherwise be a daunting effort.

One important aspect of the invention is that each type of casino system software (46) is connectable to only one specific port (collectively labeled 54*a*-54*e*) on the VLANs (26*a*-26*e*). So, for example, if the specific machine (30-44) were a particular model of a Bally videogame, then they might all be connected to port No. 5 of each of their respective VLANs (26*a*-26*e*). A different model from the same manufacturer might go to port no. 6 of their respective VLAN (26*a*-26*e*) if it operated with a different casino system (46). Another manufacturer with a different machine but that operated with the same casino system software (46) as the first Bally gaming machine might also go to port No. 5, and so on. This way each different casino system (46) has a unique designated home port (54*a*-54*e*) that doesn't vary from location to location. Accordingly, the experience of the test engineers is virtually identical to the experience he or she would have as if they were testing the gaming machines (30-44) in real time in a casino under real life conditions.

An alternative embodiment of the invention allows other types of equipment (52) to be tested on the system (10) for compatibility, functionality, security, pay out, etc. against the casino software (46) on the server (44*a*) in Office No. 1. In this example a ticket redemption machine (52) is connected to the system (10) in Office No. 2. The ticket redemption machine (52) coverts tickets issued by the gaming machine (30-44) into cash. It can be tested in the three (3) different modes previously described with respect to gaming machines (30-44).

Another alternative embodiment of the invention calls for a camera (48) to be located at one or more of the remote offices (14-20). The purpose of the camera (48) is so that an engineer at Office No. 1, where the different types of accounting software packages (46) would likely be located, to help the engineer in Office No. 2. to set up the gaming machine (44) for testing.

The system (10) is completely secure in that there are no gates or paths into the system (10) from outside of the offices (12-20). AES 256 and other security/encryption techniques recognized by Homeland Security and the National Institute of Standards help to keep the system secure.

The invention (10) effectively solves a multitude of issues that are faced by a global testing supplier in the gaming industry. A casino floor is a completely interconnected entity that places varied responsibilities on every endpoint connected. To appropriately test equipment to be used on a casino floor all of the endpoints need to be tested together. With each system, game, kiosk, and device residing in only one of many global offices, a need arose to provide access to each, and every configuration imaginable. This intercommunication between all components would have to be accomplished without the time, expense, and knowledge involved in shipping gaming products between offices. More specifically, the present invention (10) uniquely helps overcome the following hurdles:

1. Secure Scalability: Sufficient controls are put in place to allow the invention (10) to be fully scalable and to allow as much or as little access as needed. The configuration allows for as many systems and/or system versions to be connected to as many gaming devices, and/or gaming device versions, as needed without introducing conflicts or limiting performance. Additionally, remote workstations provide unique user access and sufficient separation of rights to allow system testing, game testing, and interoperability testing to occur simultaneously without interruption of other such testing.

2. Testing Variety: The invention (10), through unique configurations, provides the ability to efficiently perform testing on endpoints with dependencies on specific cabinets, top boxes, and other peripheral devices. Without limiting the testing scope, this previously could only be found in the office that performed the original certification. This reduces the cost of supplying or shipping equipment that is expensive, not to mention time consuming. Additionally, systems are no longer required to be placed and configured in multiple offices to meet the varied needs of the global market. Examples of this could include an international jurisdiction versus a domestic jurisdiction, or a Class III environment versus a Class II environment. A single system can be placed in one office and be configured as needed to communicate with the varied endpoints tested in other offices. This greatly reduces hardware and software costs for system approvals.

3. Testing Coverage: The invention (10) provides the ability to test more than one system at a time, in conjunction with a gaming device where each resides in separate offices. For example, a remote configuration/downloadable system can be used to test the effect of that system on an online monitoring system through a connection from each to a gaming device. In this case, actions from one system have a direct impact on the other system. Additional examples of systems that would require testing in conjunction with another system include, but are not limited to, accounting systems, cashless systems, bonus systems, ticketing systems, Class II edge servers, progressive systems, and multi-station gaming device systems. Finally, the invention (10) can also be used to test the protocol implementations of systems and/or gaming devices by remotely connecting each to a testing tool such as a protocol simulator.

4. Consolidated Knowledge Base: The invention (10) solves a variety of knowledge-base issues that arose when any type of connected endpoint testing was performed in a single office. Prior to the invention (10), the testing of two endpoints was solely performed by an engineer with knowledge of only one of the endpoints. Now system and game engineers can pool their resources when testing the interoperability of each of their products since each now have the ability to perform their portion of the testing cooperatively. Additionally, protocol-specific engineers can be easily integrated for evaluation of either product.

5. Easy Content Sharing: The invention (10) has the capability to provide access across offices to game content shipped to only one office through the use of downloadable systems that are becoming industry standard. Testing engineers in offices worldwide can select from game content libraries maintained in one location for use to meet any testing needs in their particular remote location.

6. Supplier Access: The invention (10) also allows the ability to grant supplier access to any system or game tested by testing engineers worldwide. The aforementioned separation of user rights and remote location of devices allow a testing office to grant this access without compromising the intellectual property rights of the manufacturer's product. This allows testing offices the ability to provide manufacturers with the tools to test their products with any endpoint maintained by testing office that the manufacturer may expect to work with in the field.

7. Security: The invention (10), through the use of a secure VPN router, also provides secure communication over the internet ensuring that all manufacturer traffic is safely obfuscated from anybody who may be viewing the communications.

As used in this disclosure the term gaming machine (30-44) can not only include video games, slot machines and ticket redemption machines (52), it can also include: video lottery devices; video lottery systems; player loyalty systems; server based gaming systems; electronic bingo systems and terminals; lottery systems; pari-mutuel wagering systems; Internet wagering systems and interactive wagering systems.

While the invention has been described with regard to the preferred embodiment thereof, it will be appreciated by those of ordinary skill in the art that modifications can be made to the structure and components that comprise the system, without departing from the spirit and scope of the invention as a whole.

The invention claimed is:

1. A system for testing one or more gaming machines at a first location using a host system server at a second location, said system comprising:

a first networking apparatus located at said first location, said first networking apparatus having a plurality of ports thereon for connection to said one or more gaming machines;

said one or more gaming machines located at said first location each connected to one of said plurality of ports of said first networking apparatus;

a second networking apparatus located at said second location, said second networking apparatus has a plurality of ports and is connected to said host system server, said host system server includes host system software configured to simultaneously perform system testing, game testing, and interoperatibilty testing on said one or more gaming machines located at this said first location; and, a camera connected to said first networking apparatus at said first location and focused on said one or more gaming machines at said first location so that a worker at a location remote from said first location can assist in the set-up of said one or more gaming machines at said first location prior to testing; and, an Internet network for connecting said first networking apparatus to said second networking apparatus, wherein the first and second networking apparatuses are connected via a virtual local area network (VLAN), wherein said host system software located at said second location includes a plurality of software packages utilized to test said one or more gaming machines located at said first location, each software package of the plurality of software packages is configured to test a specific type of gaming machine which is a specific one of a plurality of different types of gaming machines, and wherein each specific software package included in said host system software on said host system server is assigned to a specific port, corresponding to a specific port number, of the first and second networking apparatuses such that each software package at the second location is capable of connecting, through the specific port number, with all game machines at the first location that correspond to the specific type of game machine.

2. The system according to claim 1 wherein said Internet network connection is through a secured VPN Layer 2 communications network.

3. The system according to claim 2 wherein multisystem isolation is achieved by VLAN tunnels.

4. The system according to claim 3 wherein said host system software comprises a casino system to track currency inputted into said one or more gaming machines.

5. The system according to claim 4 said testing of said one or more gaming machines takes place at said first location.

6. The system according to claim 4 wherein said testing of said one or more gaming machines takes place at said second location.

7. The system according to claim 4, wherein a plurality of locations include a plurality of gaming machines, the system further comprising:

a plurality of networking apparatuses each located at a different location of said plurality of locations, wherein each type of said plurality of different types of gaming machines are connected a specific port corresponding to the specific port number, associated with a specific type of gaming machine, on each of said plurality of networking apparatuses at said plurality of locations.

8. The system according to claim 4 wherein said one or more gaming machines comprise at least one of a video game or slot machine.

9. The system according to claim 4 further comprising:

a cash redeeming machine at said first location for redeeming payout tickets generated by said one or more gaming machines at said first location, wherein said cash redeeming machine at said first location can be tested for regulatory compliance with said host system software located at said second location.

10. The system according to claim 4 wherein said first and second locations are located in different legal jurisdictions.

11. The system according to claim 4 wherein said first and second locations are located in different states.

12. The system according to claim 4 wherein said first and second locations are located in different countries.

* * * * *